United States Patent
Fahlgren et al.

(10) Patent No.: US 8,601,136 B1
(45) Date of Patent: Dec. 3, 2013

(54) SYSTEM AND METHOD FOR MANAGING LATENCY IN A DISTRIBUTED TELEPHONY NETWORK

(71) Applicant: Twilio, Inc., San Francisco, CA (US)

(72) Inventors: Christer Fahlgren, San Francisco, CA (US); Jonas Boerjesson, San Francisco, CA (US); John Wolthuis, San Francisco, CA (US); Peter Shafton, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 13/911,896

(22) Filed: Jun. 6, 2013

Related U.S. Application Data

(63) Continuation of application No. 13/891,111, filed on May 9, 2013.

(60) Provisional application No. 61/644,886, filed on May 9, 2012.

(51) Int. Cl.
*G06F 15/16* (2006.01)
*G06F 15/173* (2006.01)

(52) U.S. Cl.
USPC .......................................... 709/227; 709/226

(58) Field of Classification Search
None
See application file for complete search history.

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,223,287 B1 | 4/2001 | Douglas et al. |
| 6,269,336 B1 | 7/2001 | Ladd et al. |
| 6,425,012 B1 | 7/2002 | Trovato et al. |
| 6,430,175 B1 | 8/2002 | Echols et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Peling Shaw
(74) *Attorney, Agent, or Firm* — Jeffrey Schox; Brian Van Osdol

(57) ABSTRACT

A system and method of preferred embodiments include at a signaling gateway of a first region, receiving a communication invitation of a first endpoint from a communication provider; signaling the communication invitation to a communication-processing server in a second region; in response to communication processing of the communication-processing server, dynamically directing signaling and media of the communication according to processing instructions and resources available in at least the first and two regions; wherein dynamically directing signaling and media communication of the communication comprises selectively routing media communication exclusively through communication resources of the first region if resources are available in the first region or selectively routing media communication between the first endpoint, the gateway, and at least the communication-processing server if media resources are not in the first region.

22 Claims, 14 Drawing Sheets

(56) References Cited

U.S. PATENT DOCUMENTS

| | | |
|---|---|---|
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,103,003 B2 * | 9/2006 | Brueckheimer et al. ...... 370/252 |
| 7,111,163 B1 * | 9/2006 | Haney ........................... 713/153 |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 * | 10/2007 | Riedel et al. .................. 370/252 |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,882,253 B2 | 2/2011 | Pardo-Castellote et al. |
| 7,926,099 B1 | 4/2011 | Chakravarty et al. |
| 7,962,644 B1 | 6/2011 | Ezerzer et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,150,918 B1 | 4/2012 | Edelman et al. |
| 8,266,327 B2 | 9/2012 | Kumar et al. |
| 2002/0006124 A1 | 1/2002 | Jimenez et al. |
| 2002/0077833 A1 | 6/2002 | Arons et al. |
| 2002/0126813 A1 | 9/2002 | Partovi et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0059020 A1 | 3/2003 | Meyerson et al. |
| 2003/0061404 A1 | 3/2003 | Atwal et al. |
| 2003/0088421 A1 | 5/2003 | Maes et al. |
| 2003/0123640 A1 | 7/2003 | Roelle et al. |
| 2003/0211842 A1 | 11/2003 | Kempf et al. |
| 2004/0071275 A1 | 4/2004 | Bowater et al. |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0010483 A1 | 1/2005 | Ling |
| 2005/0025303 A1 | 2/2005 | Hostetler |
| 2005/0135578 A1 | 6/2005 | Ress et al. |
| 2005/0177635 A1 | 8/2005 | Schmidt et al. |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0015467 A1 | 1/2006 | Morken et al. |
| 2006/0047666 A1 | 3/2006 | Bedi et al. |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |

(56) References Cited

U.S. PATENT DOCUMENTS

| | | |
|---|---|---|
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0074174 A1 | 3/2007 | Thornton |
| 2007/0121651 A1 | 5/2007 | Casey et al. |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0291905 A1 | 12/2007 | Halliday et al. |
| 2008/0040484 A1 | 2/2008 | Yardley |
| 2008/0091843 A1 | 4/2008 | Kulkarni |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0232574 A1 | 9/2008 | Baluja et al. |
| 2008/0313318 A1 | 12/2008 | Vermeulen et al. |
| 2008/0317222 A1 | 12/2008 | Griggs et al. |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0089699 A1 | 4/2009 | Saha et al. |
| 2009/0093250 A1 | 4/2009 | Jackson et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0082513 A1 | 4/2010 | Liu |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0191915 A1 | 7/2010 | Spencer |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0281108 A1 | 11/2010 | Cohen |
| 2011/0029882 A1 | 2/2011 | Jaisinghani |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0176537 A1 | 7/2011 | Lawson et al. |
| 2011/0211679 A1 | 9/2011 | Mezhibovsky et al. |
| 2011/0280390 A1 | 11/2011 | Lawson et al. |
| 2011/0283259 A1 | 11/2011 | Lawson et al. |
| 2011/0299672 A1 | 12/2011 | Chiu et al. |
| 2011/0320550 A1 | 12/2011 | Lawson et al. |
| 2012/0036574 A1 | 2/2012 | Heithcock et al. |
| 2012/0281536 A1 | 11/2012 | Gell et al. |
| 2012/0290706 A1 | 11/2012 | Lin et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

SYSTEM AND METHOD FOR MANAGING LATENCY IN A DISTRIBUTED TELEPHONY NETWORK

CROSS-REFERENCE TO RELATED APPLICATIONS

This application is a continuation of co-pending U.S. patent application Ser. No. 13/891,111, which claims the benefit of U.S. Provisional Application Ser. No. 61/644,886, filed on 9 May 2012, both of which are incorporated in their entirety by this reference.

TECHNICAL FIELD

This invention relates generally to the telephony field, and more specifically to a new and useful system and method for managing latency in a distributed telephony network.

BACKGROUND

In recent years, innovations in the web application and Voice over Internet Protocol (VOIP) have brought about considerable changes to the capabilities offered through traditional phone services. In some distributed or cloud-based telephony systems, the routing of audio, video, or other media files can be determined or limited by the location and/or availability of the appropriate computing resources. In some instances, some or all of the callers reside in the same region, country, or continent as the bulk of the computing resources, thereby promoting increased call quality. However, if one or more of the parties to the call is located in a different region, country, or continent, then it is not readily apparent which computing resources should be utilized. Similarly, if the platform infrastructure is based in one region, communication outside of that region will be poor quality. For example, if the two callers reside in different countries, it might be unclear which of many computing resources should be allocated to the particular session. Furthermore, as more communication platforms are supported by cloud computing services located in distinct areas, core-computing infrastructure may be limited to particular locations. Accordingly, there is a need in the art for determining the shortest, highest quality, and/or optimized route for session traffic in a globally distributed telephony system. This invention provides such a new and useful system and method, described in detail below with reference to the appended figures.

DESCRIPTION OF THE PREFERRED EMBODIMENTS

Figure 1:
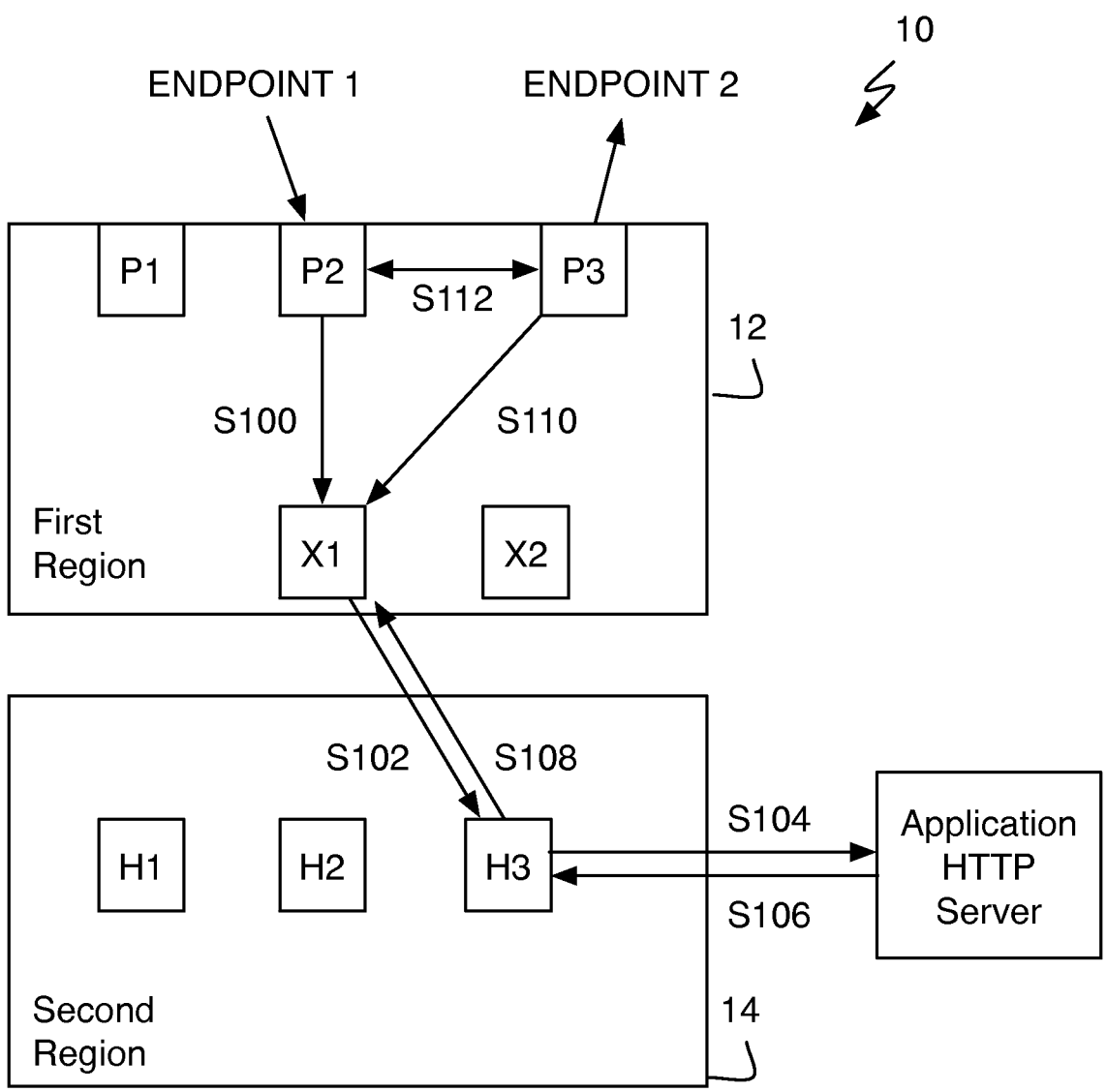
FIG. 1 is a schematic block diagram of a system and method for managing latency in a distributed telephony network in accordance with a preferred embodiment of the present invention.

The following description of preferred embodiments of the invention is not intended to limit the invention to these preferred embodiments, but rather to enable any person skilled in the art to make and use this invention.
Preferred System As shown in FIG. 1, a system 10 of the preferred embodiment is configured for managing a distributed communication network operation in at least two regions 12, 14. The preferred system 10 can be used with any suitable cloud-computing environment, such as the one described in patent application Ser. No. 12/417,630 filed 2 Apr. 2009, entitled "System and Method for Processing Telephony Sessions", which is incorporated in its entirety by this reference. The system 10 preferably functions to provide the highest quality path for communication between two endpoints in response to one or both of a selected media type and/or the location/configuration of the endpoints of the communications. As an example, the preferred system 10 can function to minimize network latency between different types of endpoints (mobile, PSTN, browser-based telephony, client mobile devices, client browsers) using different types of media (voice, video, text, screen-sharing, multimedia) and disposed in different regions, countries, or continents. In one preferred embodiment, the system 10 is configured for managing a distributed telephony network, but may alternatively be configured for mobile/browser client communication networks, video communication, screen-sharing communication, synchronous media communication, or any suitable communication network. In operation, the preferred system can perform routing and latency minimization in response to one or more of: the features/capabilities of the endpoints; a media quality measurement (video and audio recording); codec availability/compatibility; media resource availability; and/or any suitable metric. During operation, the communication flow of the system 10 will preferably shift between operations modes—a first mode comprising communication flow between an endpoint of a local region to a remote region with more resources and a second mode comprising communication flow within the local region. Communication flow is preferably a media data stream that is used in the substantially real-time communication of media or multimedia. An exemplary benefit of the system 10 is that complex, stateful, or expensive communication resources may be maintained in limited regions and other resources can be implemented globally or regionally to support particular local regions. The limited communication resources may be complex because they maintain considerable state information of the platform, and replicating the state information regionally/globally would result in increased complexity and cost. Communication platforms, which may be susceptible to global/regional scaling issues due to the real-time nature of synchronous communication, can use the system to dynamically switch between communicating within a local region and communicating with resources of a remote region.

As shown in FIG. 1, the preferred system 10 is operable in at least two regions 12, 14, which are connectable through and/or serviced by a communication-processing server 16. The preferred system 10 can also include one or more provider services (P1, P2, P3, PN) and one or more gateways (X1, X2, XN) in the first region 12 and one or more communication-processing servers (H1, H2, H3, HN) in the second region 14. The preferred system functions to maintain functional communication when the first region 12 and second region 14 are spatially separated by a globally significant transmission distance. A globally significant distance in this document may be understood to be a transmission distance greater than 2000 miles and more preferably greater than 5000 miles. For example, the first region 12 may be on the West coast of the US and the second region 14 may be on the East coast, separated by a geographic distance greater than 2500 miles. In another example, the first region 12 may be in the United States and the second region may be in Europe, separated by a distance greater than 3500 miles. The first region 12 and the second region 14 are not limited to functioning with such distance ranges and may be separated by a distance less than 2000 miles or exceeding 5000 miles.

The provider services (P1, P2, P3) preferably receive or initiate communication to an endpoint such as a caller, a mobile or browser client. The provider service is preferably an interface between the communication platform of the system 10 and communication providers. Communication providers preferably include telephony carrier networks, client applications using IP based communication protocols, or any suitable outside network. The system 10 may include a plurality of regions in addition to the first and second regions 12, 14. The provider services are preferably specific to each region as they are determined by the communication service providers, networks, and established contracts with various communication entities.

Incoming communications to a destination endpoint are preferably routed to the provider services in response to the destination endpoint being registered with the system 10. For example, a user dialing a PSTN number belonging to the system 10 will preferably have the communication directed to a provider service (P1, P2, or P3). Another example, a user dialing a SIP based endpoint that specifies a domain registered in DNS to the system 10 will preferably have the communication directed to a provider service (P1, P2, or P3). The provider additionally creates invite requests and responses that are preferably sent to a regional address (e.g., europe.twilio.com) and resolved to a communication gateway. In some variations, communication may be directly connected to a communication gateway to achieve a lower latency audio/video. This may be particularly advantageous to mobile and browser clients. The Domain Name System (DNS), anycast, or any suitable addressing and routing methodology may be used to forward to the closest communication gateway of a particular zone. The provider services preferably use SIP protocol for communication within the system, but the outside connected communication devices may use any suitable communication protocol. Similarly, the medium of the communication can preferably include any suitable combination of possible media mediums such as audio, video, screen-sharing, or other suitable synchronous media mediums.

The communication gateways (X1, X2) are preferably configured for both media and signaling. A communication gateway preferably mediates Session Initiation Protocol (SIP) signaling between at least one endpoint of a communication, from call establishment to termination. SIP is a signaling protocol widely used for controlling communication sessions such as voice and/or video calls over Internet Protocol. Any suitable communication protocol such as RTP or combination of protocols may alternatively be used. As a SIP mediator, the communication gateway preferably creates SIP invites, issues other SIP signaling messages, and facilitates transfer of media (e.g., audio, video) between various end-points. The communication gateways (X1, X2, XN) are preferably logical network elements of a SIP application, and more preferably configured as back-to-back user agents (b2bua) for one or both of media and signaling control. A b2bua, as would be readily understood by a person of ordinary skill in the art, preferably operates between endpoints involved in a communication session (e.g., a phone call, video chat session, or screen-sharing session). The b2bua also divides a communication channel into at least two communication legs and mediates signaling between the involved endpoints from call establishment to termination. As such, the communication gateway can facilitate switching the communication flow from flowing through a remote region (to use remote resources) to flowing just within the local region (e.g., when establishing a call with another endpoint in the local region). The communication gateway may additionally include media processing components/resources such as Dual-tone Multifrequency (DTMF) detector, media recorder, text-to-speech (TTS), and/or any suitable processor or service. The media processing and signaling components of a communication gateway may alternatively be divided into any suitable number of components or services in cooperative communication. In one variation, the communication gateway is implemented by two distinct components—a signaling gateway that handles the signaling and a media gateway that handles media processing and media communication. In an alternative embodiment, the communication gateways may be configured as a control channel that functions to allow devices to directly communicate peer-to-peer. Browser clients, mobile clients, or any suitable combination of clients may have direct media communication in this variation. This alternative embodiment is preferably used with low-latency media. As an additional security precaution, communication gateways may be configured to allow traffic from only a distinct set of providers. Other providers are preferably firewalled off to protect infrastructure from the public Internet. The communication gateways will preferably respond to communications and/or propagate the communication messages to a communication-processing server. The communication-processing server may be in a different remote region. Load balancers may additionally facilitate a communication propagating from a communication gateway to an optimal communication-processing server. For example, there may be multiple remote regions with available communication-processing servers that can service a communication. A load balancer or alternatively a routing policy engine may direct the communication to an appropriate the region and/or communication-processing server.

The communication-processing servers (H1, H2, H3) function to process communication from a communication gateway. A communication-processing server preferably provides value-added features or services to a communication. A preferred communication-processing server is preferably a call router or telephony application processing component as described in patent application Ser. No. 12/417,630 referenced and incorporated above. A communication-processing server (or more specifically a call router) will preferably retrieve an addressable application resource (e.g., HTTP URI address document) associated with the phone number or communication indicator. In a preferred embodiment, the resource is a telephony application that indicates sequential telephony commands for the communication session of the client(s). The telephony commands may include instructions to call another communication endpoint, to start a conference call, to play audio, to record audio or video, to convert text to speech, to transcribe audio, to perform answering machine detection, to send text or media messages (e.g., SMS or MMS messages), to collect DTMF key entry, to end a call, or perform any suitable action. The telephony instructions are preferably communicated in a telephony instruction markup language such as TwiML. The addressable resource is preferably hosted at the HTTP Server 16. The servers (H1, H2, H3) and HTTP server 16 communications are preferably RESTful in nature in both/all directions. RESTful is understood in this document to describe a Representational State Transfer architecture as is known in the art. The RESTful HTTP requests are preferably stateless, thus each message communicated from any component in the system 10 preferably contains all necessary information for operation and/or performance of the specified function. Signaling will preferably be transferred through the server, but media may not be transferred through the server.

The communication-processing server is preferably part of a telephony application platform and may cooperatively use several other resources in operation. The communication-processing server may be a central component to the service provided by a platform and as such may be associated with considerable stateful data generated in use of the server. The stateful data may be used in internal logic and operation of the platform and/or for providing API accessible data and information. The system 10 is preferably implemented in a multi-tenant environment where multiple accounts share/operate with the same resources. As such, there may be benefits in keeping the communication-processing servers centrally located in a limited number of regions. Since the communication-processing server may not be located in each local region, a local region may call out, bridge or otherwise communicate with a remote region that does hold a communication-processing server. As mentioned above, the communication-processing server may provide any suitable processing services in addition to or as an alternative to the call router variation described above.

As shown in FIG. 1, the preferred system 10 can route communication traffic between User 1 and User 2, wherein the communications traffic can include any suitable media type, device endpoint type, and/or network type usable in a suitable cloud-based communications system of the type described above. In an example of the preferred system's 10 operation, when User 1 wants to communicate with User 2 (a PTSN number that is part of the cloud-based system), his call is routed to provider P2. As described below, the number dialed is preferably associated with a URL or other identifier usable in the aforementioned cloud-communications system. Preferably, provider P2 creates a corresponding invite request in block 100 and sends it to a predefined server address (e.g., europe.twilio.com, us__1.twilio.com, us__2.twilio.com, etc.), which in turn resolves to communication gateway X1. Upon receipt, the communication gateway X1 preferably transmits or forwards the request to communication-processing server H3 in block S102, which as shown can be located in the second region 14. The server H3 functions to query the HTTP server 16 associated with the URL of the dialed number in block S104 to determine, receive, download, and/or capture any instructions, commands, or content associated with the dialed number. The HTTP server 16 is preferably an outside server managed by a developer or administrating entity. In a simple example, the server H3 contacts the HTTP server 16 and receives a single command (i.e., a "dial" verb) associated with the number. Other suitable commands, each of which can be referred to as a TwiML verb in the example embodiment, can include saying text to the caller, sending an SMS message, playing an audio and/or video file, getting input from the keypad, recording audio or video, connecting the call to another phone, or any other suitable type or media of communication.

As shown in FIG. 1, in block S106 the HTTP server 16 returns the TwiML to server H3, at which point the server H3 processes the TwiML to determine the particulars of the initial request, i.e., to whom the call is directed, where the other endpoint is located, what type of media is being directed to the second user, and the like. In the example embodiment shown in FIG. 1, the second user is located in the first region 12 with the first user, and therefore the server H3 returns the invite request back to communication gateway X1 for further processing in block S108. Upon receipt, the communication gateway X1: determines that the inbound request is related to the prior invite request received in block S100; and transmits the request to a predetermined provider P3 in block Silo for eventual connection of the communication to the second user from P3. Preferably, upon connection between provider P3 and the second user, the communication traffic between the first and second users will flow directly between the providers P2 and P3 in block S112 with little to no input from any other component of the preferred system 10 in the second region 14. In one variation of the preferred system 10, media files and/or functionality are stored at and/or performed by one or more of the communication gateways X1 working alone or in combination with each other or additional servers, databases, and/or controllers. As will be described in further detail below, the communication traffic may be subsequently dynamically redirected to route through the server H3. For example, one of the endpoints may hang up, and the remaining endpoint may have communication traffic flow from the endpoint of P1 to X1 to H3 and back during the execution of other communication instructions.

Figure 2:
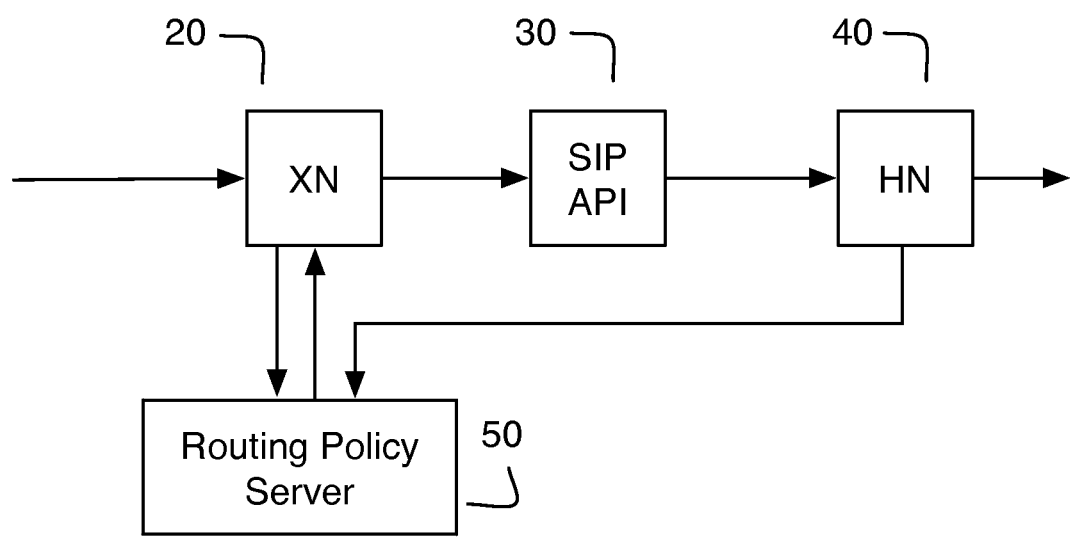
FIG. 2 is a schematic block diagram of a variation of the preferred system and method for managing latency in a telephony network.

As shown in FIG. 2, one variation of the preferred system 10 can additionally include a routing policy server 50 in communication with the communication gateway XN 20 and/or a communication-processing server H3, and further include a SIP API 30 in communication with both the communication gateway 20 and server HN 40. In one example configuration of the preferred system 10, the communication gateway 20 functions in part as a back-to-back user agent (b2bua) for one or both of media and signaling control. As an example, the communication gateway 20 can be configured to handle multiple types of re-invite scenarios and to transfer audio, video, or other media between various communicating endpoints. Preferably, the communication gateway 20 can be configured to record audio or video streams and/or play any suitable type of media file (e.g., addressed to a URL). In other configurations of the preferred system 10, the communication gateway 20 can be configured as a real-time transport protocol (RTP) hub for handling RTP communications, RTP events, and/or generating/consuming RTPC sender and receiver reports. As described below, the RTPC reports can be transmitted and/or made available to the policy server 50 such that the policy server 50 has real-time or near real-time information about the quality of different traffic routes in the larger system 10. In another variation of the preferred system 10, the communication gateway 20 can be configured as a single component/unit that handles both media and signaling processes. Alternatively, the communication gateway 20 can be configured as two distinct components (media and signaling) residing on one or more nodes in the larger system 10 environment or in any other suitable configuration or deployment in a distributed network.

As shown in FIG. 2, the present variation of the preferred system 10 can include a routing policy server 50 in communication with the communication-processing server and/or the communication gateway 20. The routing policy server 50 preferably functions to optimize the flow of traffic throughout the preferred system 10 by selecting and/or aiding in selecting the best available communication gateway 20 (X1, X2, XN) and/or communication-processing server (H1, H2) for routing the network traffic. Preferably, the routing policy server 50 optimizes traffic flow in response to one or both of the types/number/location of the endpoints (browser, VOIP, PSTN, mobile/cellular) and the type of media (voice, video, text, multimedia) used in each communication. As shown in FIG. 2, the routing policy server 50 preferably receives input/s from each of the communication gateways 20, for example in the form of RTCP sender and receiver reports, which enables the routing policy server 50 to determine in real time or near real time the current status of each of the communication gateways 20, and in turn to select the optimal communication gateway 20 for any present network session. Preferably, one or both of the communication gateway 20 and/or the server 40 can query the routing policy server 50 for the optimal route, which can be determined in response to one or more inputs received/requested from the communication gateway 20. Additionally or alternatively, the routing policy server 50 can receive from each communication gateway 20 a live quality of service report from which the policy server 5o can determine the current optimal route for any pending sessions. In another variation of the preferred system 10, the routing policy server 50 can apply a universal or generic routing protocol between nodes without consideration of the type of media being enjoyed in the communication session. In use, the preferred policy server 50 can function to prevent overloading of any particular node, server, or route in the preferred system 10 by continuously and substantially simultaneously selecting and/or aiding in the selection of the optimally configured communication gateway 20 and/or server 5o for each pending session.

As shown in FIG. 2, the present variation of the preferred system 10 can further include one or more application programming interfaces (APIs) functioning and/or exposed by one or more components in the preferred system 10. For example, a session initiation protocol (SIP) API 30 is shown in FIG. 2 for coordinating messages/communications between the communication gateway 20 and the server 40. Additionally or alternatively, the routing policy server 50 can include one or more APIs for determining the optimal route between two endpoints in the pending communication. A preferred routing policy server 50 API can be a RESTFul or any suitable alternative type of API. As noted above, in one alternative configuration the communication gateway 20 can include a media portion and a signaling portion, in which case the media portion (not shown) can include an API (such as a REST or Java API) to respond to media allocation requests from the signaling portion (not shown) of the communication gateway 20. In operation, a suitable communication gateway 20 API can expose one or more functionalities (i.e., allocation of a media resource with the following capabilities) and then return a resource identifier, IP address, and/or port to where the media should be directed.

As shown in FIG. 2, the SIP API 30 can include one or more additional headers and/or configurations for use in the preferred system 10, including a regional header, an action header, a features header, a support header, and/or a required header. In this example implementation, the regional header can indicate a zone from which the request is originating, including for example a regional or sub-regional zone of Europe, Asia, North America, and/or South America. The example action header can include instructions for the receiver to perform one or more designated actions, such as a "hang up" action. The example features header can include one or more system 10 specific features, such as an instruction to hang up if the user presses the star key on his or her terminal, whether the hardware supports call recording, and the like. The example support/required headers can include information that identify any features, protocols, functions, and/or other features that are desirable, optional, or necessary for properly routing the session through any particular set of communication gateways 20 and servers 40.

The system preferably can be configured to perform one or more of the foregoing functions in a computer-readable medium storing computer-readable instructions. The instructions are preferably executed by computer-executable components preferably integrated with the one or more communication gateways (X1, X2, XN) in the first region 12, the one or more communication-processing servers (H1, H2, H3, HN) in the second region 14, the HTTP server 16, the SIP API 30, and/or the routing policy server 50. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

Preferred Method

Figure 3:
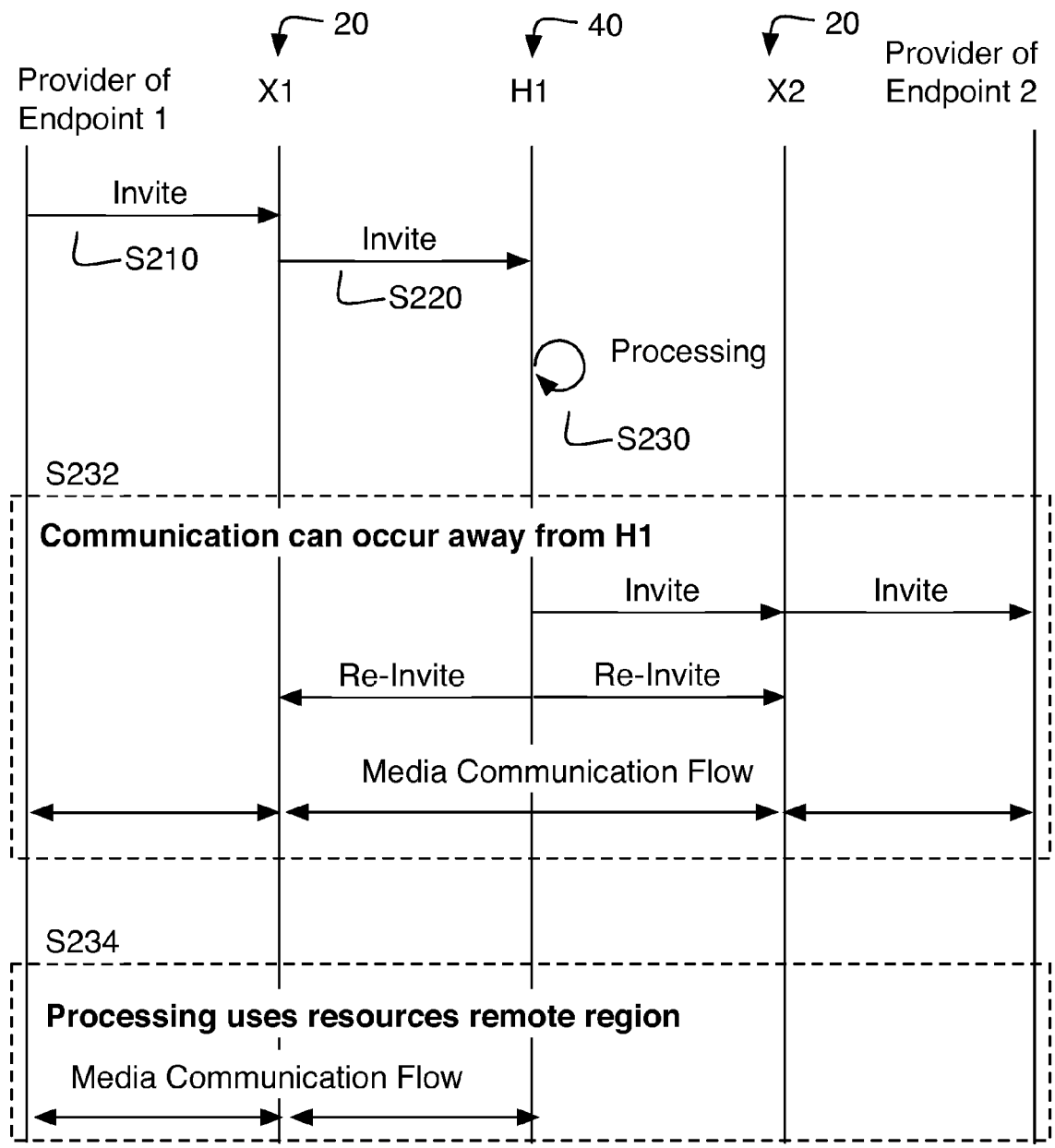
FIG. 3 is a communication flow diagram of an example implementation of the preferred method for managing latency in a telephony network.
Figure 4A:
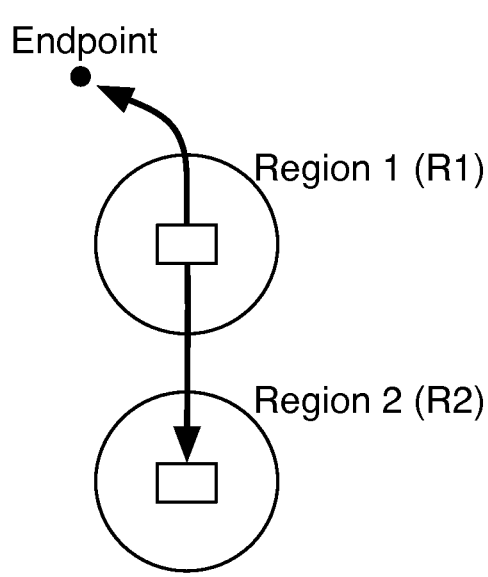
FIGS. 4A-4D are exemplary schematic representations of communication flow between a first and second region.
Figure 4B:
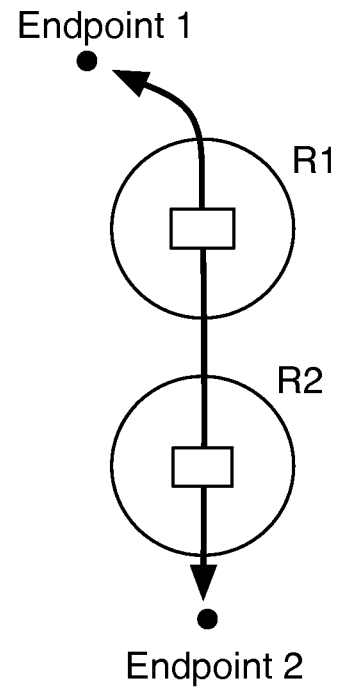
Figure 4C:
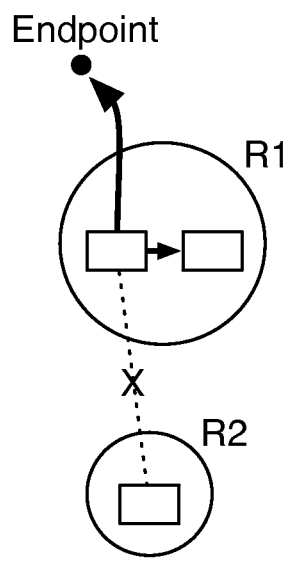
Figure 4D:
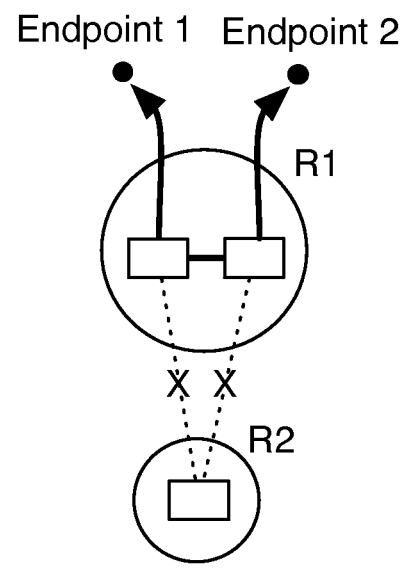

As shown in FIG. 3, a method of the preferred embodiment can include receiving a communication invitation of a first endpoint from a communication provider S210, signaling the communication invitation to a communication-processing server in a second region S220, dynamically directing signaling and media of the communication according to communication processing instructions and the resources available in at least the first and second regions S230 that includes selectively routing media communication exclusively through communication resources of the first region if media resources to execute the processing instructions are available in the first region S232 and selectively routing media communication through at least the communication-processing server if media resources are not in the first region S234. The system functions to dynamically redirect traffic for signaling and media. The method is preferably employed in a regionally/globally distributed communication platform that works with communication susceptible to latency performance issues. The method is preferably used within a communication processing platform such as the telephony platform incorporated by reference above. The method may additionally or alternatively be used with video communication, client based audio communication (e.g., VoIP), screen-sharing applications, and/or any suitable communication platform. Replicating all components in different regions can be expensive and increase complexity of a system. The method enables components to be intelligently and progressively rolled out to new regions (or be statically implemented) without fully replicating the system needed to support the features of a platform—some components may be available in one region and some in others. Preferably, a geographically distributed communication computing platform will include a subset of resources in a first region and a subset of resources in a second region. The subsets of resources are preferably not identical sets (in terms of the function of the components). A local region (used to service particular geographic regions) is preferably a limited sub-set of a remote region (used to provide core platform functionality). Preferably lightweight and ancillary services and components (e.g., signaling and standalone media processing services) are deployed in various regions to support local communication endpoints, and more core or complex resources (e.g., ones that maintain state within the platform) are deployed in a limited number of regions, which are often remotely located from the local regions. The method is preferably used to implement communication instruction processing with a communication stream between the first and second region as shown in FIGS. 4A and 4B, and when a media communication stream can flow exclusively through the first region, dynamically establishing the communication flow to not flow through intermediary media resources of the second region, but instead to use media resources of the first region as shown in FIGS. 4C and 4D.

Block S210, which includes receiving a communication invitation of a first endpoint from a communication provider, functions to initiate a communication session. Preferably a "call" will be directed to the system through a provider service of the first region. The called destination is preferably registered with the system. For example, the telephony endpoint (the phone number, phone number prefix, SIP address, the domain of the SIP address, and the like) is used to route communication to the system in any suitable manner. The provider services preferably ports or provides a network access interface through which outside communication networks connect to the system (and/or conversely, how the system connects to the outside communication networks). A communication will preferably include a call from an endpoint being directed through outside networking to a provider service interface. The provider service will preferably use SIP signaling or any suitable protocol to direct a communication stream to a communication gateway of the first region. A SIP communication invite is preferably received at the communication gateway or more specifically a SIP signaling gateway acting as a b2bua. Herein, "calls" may refer to PSTN phone calls, IP based video calls, screen-sharing sessions, multimedia sessions, and/or any suitable synchronous media communication. Calls can additionally be mixed medium/protocols. For example, a call (i.e., communication session) may have one leg connect to a PSTN telephony device while a second leg connects to a Sip based client application. Calls may alternatively be initiated from within the system such as in response to an API request or any suitable event.

Figure 7:
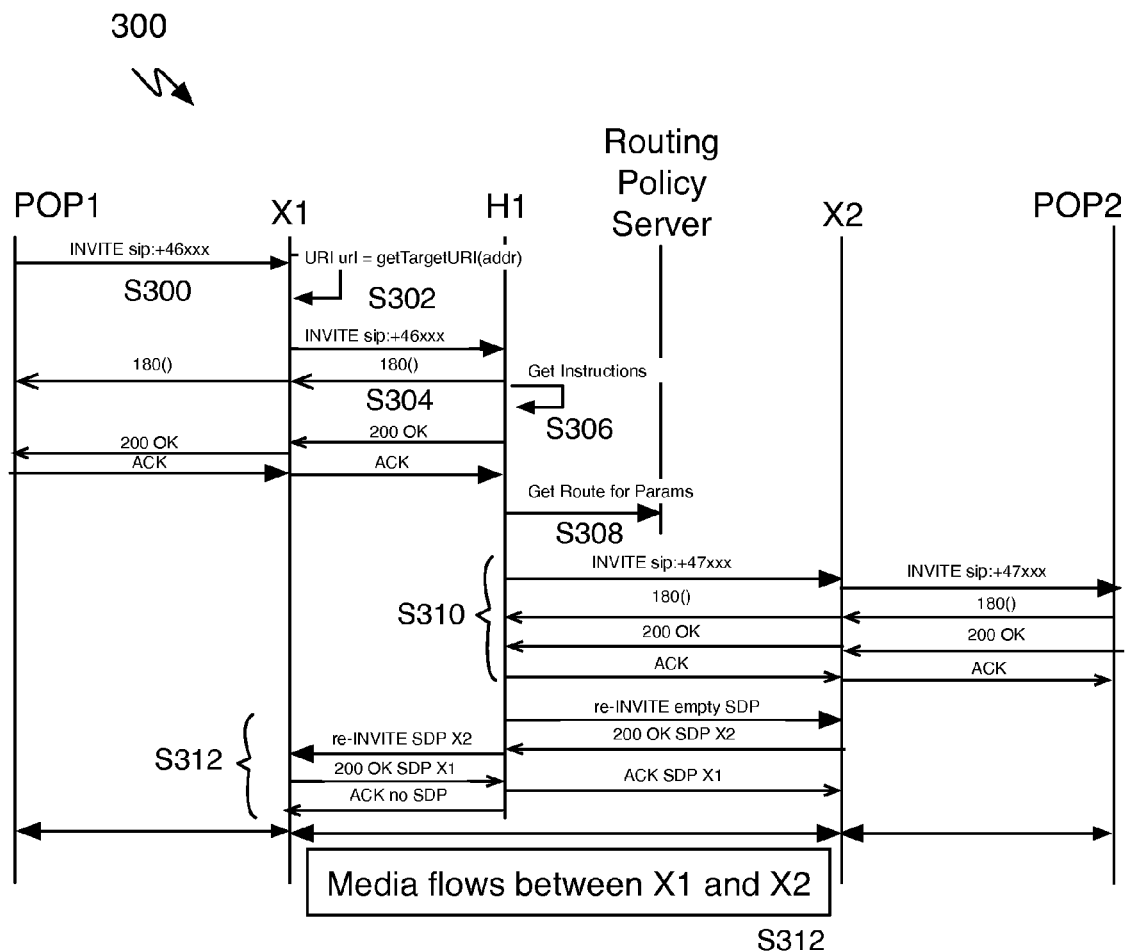
FIG. 7 is an exemplary communication flow diagram of an implementation for a call between two PSTN devices of the method of the preferred embodiment.

Block S220, which includes signaling the communication invitation to a communication-processing server in a second region, functions to direct the communication to a communication-processing server in another region. The other region (the second region) is preferably spatially separate and remotely located from the first region. The distance of separation is preferably a globally significant distance. Within the US, the distance may be greater than 2000 miles (across country). Across the globe, the distance may be greater than 5000 miles. The communication gateway preferably directs the communication signaling. As shown in FIG. 7, the communication invitation is preferably a SIP invite but may alternatively be a communication invitation of any suitable protocol. The communication gateway may additionally query a routing policy engine prior to transmitting the communication invitation. The routing policy server will preferably determine an appropriate routing of the call. Preferably the routing policy server will identify the appropriate communication-processing server in the second region. Additionally, the routing policy server may consider communication-processing servers in a plurality of regions (possibly including the first region). In another variation, the routing policy server may detect that the resources for processing the particular call can be handled within the first region and direct that call appropriately within the first region. For example, a particular phone number may not be configured for telephony application processing and simply redirect to another endpoint accessible through the first region. In this example, the communication gateway may forego accessing a call router in a second region, and establish media communication flow between the first and second endpoint using resources of the first region.

The communication-processing server can provide any suitable communication processing service. Preferably, the communication-processing server acts as a call router that manages execution of a communication session application. Processing a communication application can include operations such as connecting to endpoints, recording media, processing media (converting text-to-speech, transcribing audio to text, transcoding between media codecs), retrieving device inputs (e.g., DTMF capture), sending messages or emails, ending calls, providing answering machine detection, or providing any suitable service. In one preferred variation, the method may additionally include, within the second region, a communication-processing server retrieving application instructions from an internet accessible server at a URI that is associated with a destination endpoint of the communication invitation. In this variation, the communication-processing server is preferably a call router as described in the incorporated patent application Ser. No. 12/417,630. The application instructions are preferably formatted as markup instructions within a document retrieved over HTTP using a web request-response model.

Block S230, which includes dynamically directing signaling and media of the communication according to communication processing instructions and the resources available in at least the first and second regions functions to redirect communication to appropriate regions. The directing of signaling and media is preferably dynamically responsive to the active state of the communication. Preferably, the signal and media direction is responsive to application state of a communication. Application state may include streaming media between two outside endpoints, playing media from the system to an endpoint, processing or recording media of a communication, or any suitable application state. The communication routing is preferably changed to increase the communication performance of the current state of a communication. For example, if a first endpoint is connected to a second endpoint, and the first and second endpoints are in the same region, the communication media stream is preferably kept within the first region. This can preferably reduce the amount of communication latency that might be involved in routing through a second region. In a contrasting situation, if the communication of a first endpoint necessitates particular media processing not available in the first region, a communication flow may be established with a second region. Additionally, an application can be configured with any suitable logic. For example, a call may be responsive to a new connection to an endpoint, to one of two endpoints hanging up, to initiating media processing (e.g., audio recording, transcription, or DTMF detection), or to sending an out of stream communication (e.g., SMS or MMS) and the like.

Block S232, which includes selectively routing media communication exclusively through communication resources of the first region if media resources to execute the processing instructions are available in the first region, functions to route communication within a region. The resources of the region are preferably sufficient to support the current state of the communication session. In a preferred variation, the media communication is exclusively routed through the communication resource of the first region for calls to other endpoints in the region. Block S132 preferably includes a communication-processing server inviting a second gateway, the second communication gateway inviting a second endpoint accessible through a provider service of the first region, and the communication-processing server re-inviting the first and second communication gateways to establish media communication flow between the first and second endpoints. The communication is also directed away from the communication-processing server of the second region. As a slight variation, the media communication flow may even be established to flow directly between the first and second endpoints without passing through a gateway of the first region. The first and second endpoints can be PSTN-based endpoints, SIP based endpoints, RTP based endpoints or any suitable endpoint. An endpoint is preferably any addressable communication destination, which may be a phone, a client application (e.g., desktop or mobile application), an IP based device or any suitable communication device. The endpoints can use any suitable protocol and the first and second endpoints may additionally use different communication protocols or mediums.

Additionally or alternatively, routing media communication exclusively through communication resources of the first region may include selecting a media resource of the first region to facilitate the media communication flow. In some cases, select media resources may be deployed/implemented in the first region. When the current communication media stream transitions to a state where it requires only the media resources of the first region, the media communication flow will preferably utilize the media resources of the first region, rather than those of the remotely located resources in the second region. For example, an application may initiate a media recording instruction. If a recording resource is in the first region, the communication gateway may direct communication flow to go to the local recording server as opposed to a recording server in a different region. In another example, a media transcoding server may be accessed to transcode media for two endpoints. Two endpoints may use different media codecs that are not compatible. The transcoding service will preferably be added as an intermediary in the communication flow so that the media can be transcoded with low latency.

The method may include querying a routing policy service for a selected communication route, which functions to dynamically select a communication route. The routing policy server can use the current state of the system, individual regions, individual resources/services/components of a region, application state, or any suitable parameter as an input. In one variation, the routing policy service is substantially statically defined. A set of rules and/or architecture configuration may be used to select the routes. In another variation, the routing policy service performs an analysis and selects a route that has statistical indications to be an optimal route based on the analysis. The routing policy server is preferably queried by the communication-processing server to select communication gateways. The routing policy server may additionally or alternatively be used by the communication gateway to select a communication-processing server in block S220. There may be one canonical routing policy server or multiple routing policy server instances may be established in multiple regions.

Block S234, which includes selectively routing media communication through at least the communication-processing server if media resources are not in the first region, functions to route communication between the first and second regions. This selective option is preferably taken when the resource needed or preferred for handling the communication session is not within the local region (i.e., the first region). As with the initiation of a call, the communication gateway preferably initially connects to a communication-processing server. As was mentioned above, this default behavior may not be taken if the next state of the communication is known without accessing the communication-processing server. Additional resources within the second region may additionally or alternatively be used with the communication-processing server. For example, media resources such as recording service, text-to-speech servers, transcoding servers, transcription/speech recognition servers, and/or any suitable media resource may be implemented in the second region and may act on the media communication flow.

Figure 5:
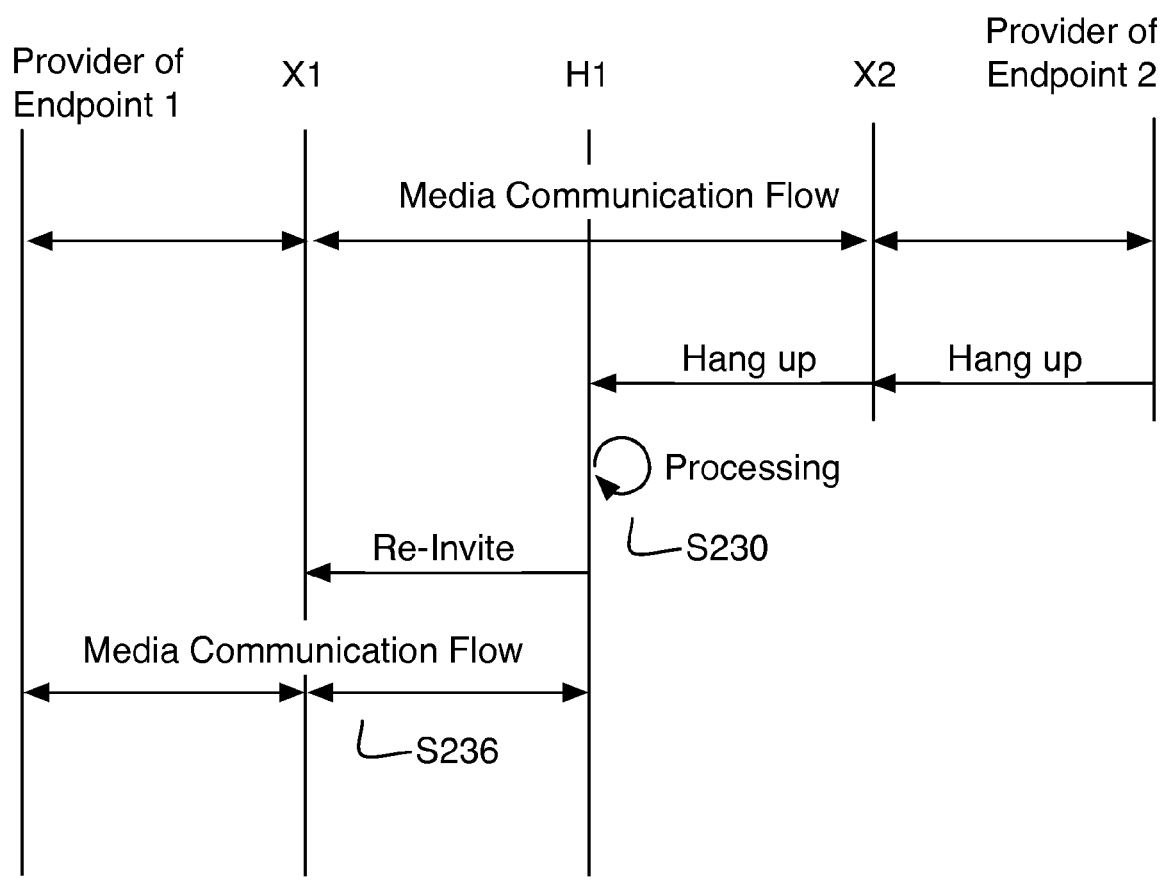
FIG. 5 is a communication flow diagram of a variation re-establishing communication of the preferred embodiment.

As mentioned above, the directing of the communication can dynamically change. The method may additionally include re-establishing communication with the communication-processing server upon a second endpoint terminating the media communication flow S236 as shown in FIG. 5. Block S236 can function to enable the communication to recover after communication flow has moved away from a resource of the second region. As mentioned, the second region preferably includes a communication-processing server that can be configured for processing application state of a communication session. Since the communication-processing server may not be in the communication flow when two endpoints are connected, a communication gateway in the first region will preferably re-invite a communication-processing server and reestablish communication flow between the first endpoint and the communication-processing server. For example, two callers may be talking in a first region. When the callee hangs up, the first caller may be connected to a call router in a second region that can play text to speech audio or perform any suitable application action. The communication flow can be redirected any number of times.

Figure 6:
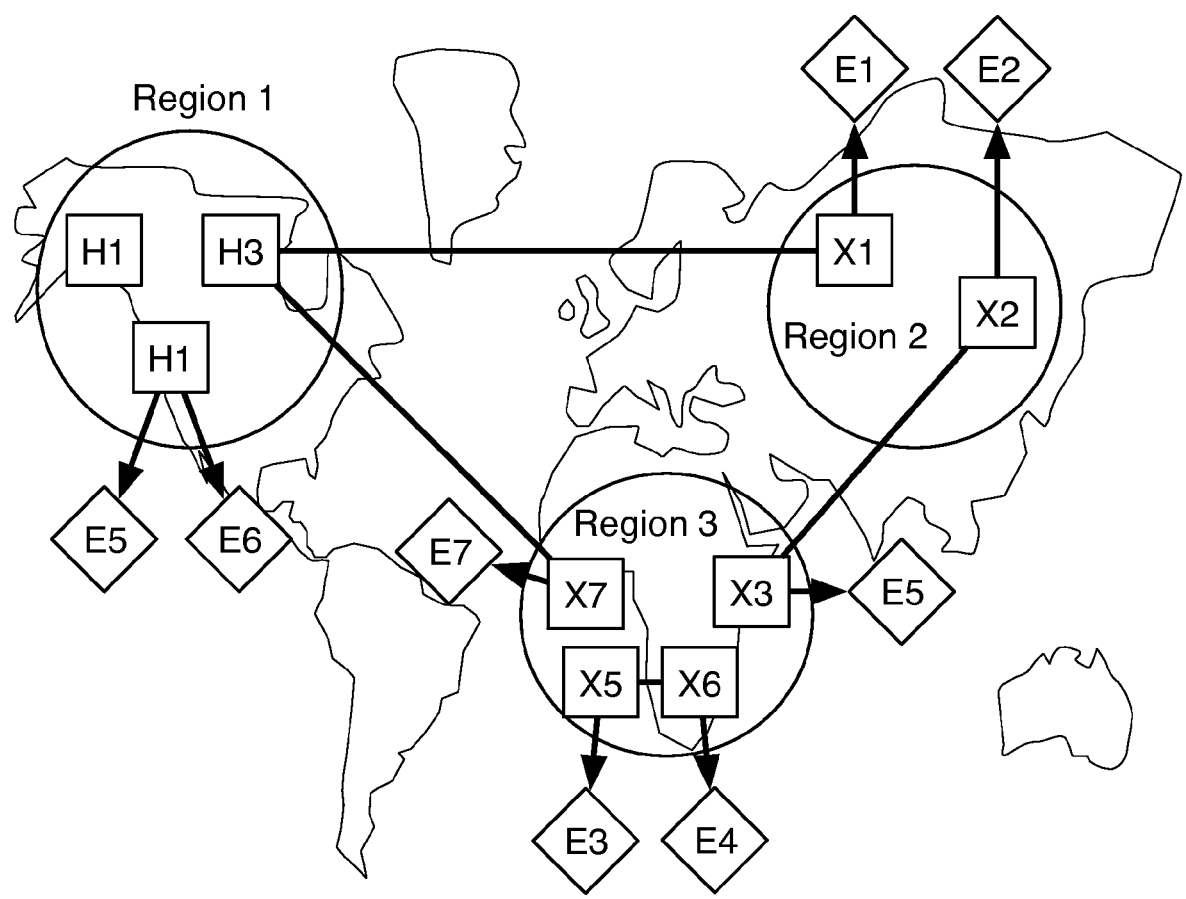
FIG. 6 is an exemplary representation of the system and method of the preferred embodiment implemented within various regions.

As shown in FIG. 6, the method may additionally be expanded such that communication flow may be directed between any suitable number of regions. In an exemplary implementation, there may be at least two base regions in the US, with globally diversified local regions such as one in Europe, one in Asia, and one in South America. These regions may dynamically route communication based on an optimal or preferred route. The preferred route may be based on substantially static configuration of the different regions (e.g., how many resources are in each region), but may alternatively be based on quality metrics such as latency, quality of service reports, or any suitable metrics.

EXAMPLE IMPLEMENTATIONS

As shown in FIG. 7, one example implementation of the system and/or method of the preferred embodiment can include a telephone call between a pair of PSTN telephone users. Those of skill in the art will readily appreciate that the following description is of an exemplary setting of the system and/or method of the preferred embodiment and does not limit the claimed invention to any particular aspect or feature described below. As shown in method 300 in FIG. 7, block S300 can include receiving a call invitation at a first communication gateway X1 from a first user's POP (point of presence provider or in other words a provider server). As noted above, FIG. 7 illustrates a single use case in which the desired communication is between two PSTN users. Accordingly, the content of block S300 can include an invitation for a voice call identifying both the media (voice) as well as the desired endpoint (phone number to which the call is directed).

In block S302, the first communication gateway preferably performs any necessary authentications, security checks, verifications, and/or credential checks for one or both of the caller and the recipient. Block S302 can additionally include looking up and/or identifying a target uniform resource identifier (URI) for the invitation, which designates the next destination for the transmission, i.e., the suitable regional communication-processing server H1 for the request. As shown in FIG. 7, upon receipt of the request at the server H1, the server H1 responds to the communication gateway X1, which in turn propagates the response back to the POP (point of presence) service (e.g., the provider service) in block S304.

In block S306, the server H1 downloads and/or retrieves the TwiML based on the URI associated with the dialed number (which corresponds to an address in one variation of the preferred system and method). Preferably, block S306 can further include determining if there is any media associated with the session. Preferably, the existence or requirement of a particular media can be determined with reference to the TwiML, which can contain predefined actions or verbs. Suitable actions or verbs can include dialing a number, saying text to the caller, sending an SMS message, playing an audio or video file, getting input from the keypad, recording audio or video, connecting the call to another browser client or device, or any other suitable type or media of communication. In the example implementation, the TwiML would contain the "dial" verb, which requires media. Following a series of mutual acknowledgements, the transmission of media is opened up between the POP and the server H1 in block S306.

As shown in FIG. 7, the example implementation can include block s308, which includes determining an optimal route for the media at the routing policy server. Preferably, block S308 is performed substantially simultaneously with the series of acknowledgements performed in block S306. Preferably, the policy server 50 optimizes traffic flow in response to one or both of the types/number/location of the endpoints (browser, VOIP, PSTN, mobile/cellular) and the type of media (voice, video, text, multimedia) used in each communication. As noted above, the routing policy server preferably receives input/s from one or both of the communication gateways X1 or X2, for example in the form of RTCP sender and receiver reports, which enables the routing policy server to determine in real time or near real time the current status of each of the communication gateways X1 and X2, and in turn to select an optimal communication gateway X2 for the proposed call. Here optimal is used to indicate an algorithmically probable best route. As shown in FIG. 3, the server H1 requests the optimal route from the policy server in block S308. Additionally or alternatively, the routing policy server can receive from each communication gateway XN a live quality of service report from which the policy server can determine the current optimal route for any pending sessions.

As shown in FIG. 7, once the policy server determines the optimal route (i.e., a second communication gateway X2), it will return the appropriate URI to the server H1 so that the server H1 can communicate directly with the second communication gateway X2. In block S310, the example implementation can include a series of requests, invites, and acknowledgements between the server H1, the second communication gateway X2, and the second POP destination of the call recipient. Upon establishing the second leg of the communication session, block S312 can include checking the two endpoints (via first and second communication gateways X1 and X2), and then permitting media to flow between the first and second communication gateways X1 and X2 in block S314.

Preferably, the server H1 is not involved in the media flow of block S314. Accordingly, another example implementation can include detecting, at each of the first and second communication gateways X1 and X2, whether each respective side of the session has timed out for some reason. In response to a timeout at the first communication gateway X1, the first communication gateway X1 will alert the server H1, which in turn will hang up both the caller side and the callee side of the session. Alternatively, if it is the second communication gateway X2 that times out, then the server H1 can be configured to only terminate or hang up on the callee side in the event that there are more actions or verbs to execute on the caller side.

The foregoing example implementation illustrates one aspect of the preferred system and method using a single dial verb between two PSTN users in a telephony system. However, the preferred system and method can be readily configured for any suitable combination of verbs, user types, and media types found in a cloud-based communication network system. Some example alternative implementations can include usage of the say verb, the hang up verb, the gather verb, either alone or in combination with the dial verb described above.

Figure 8:
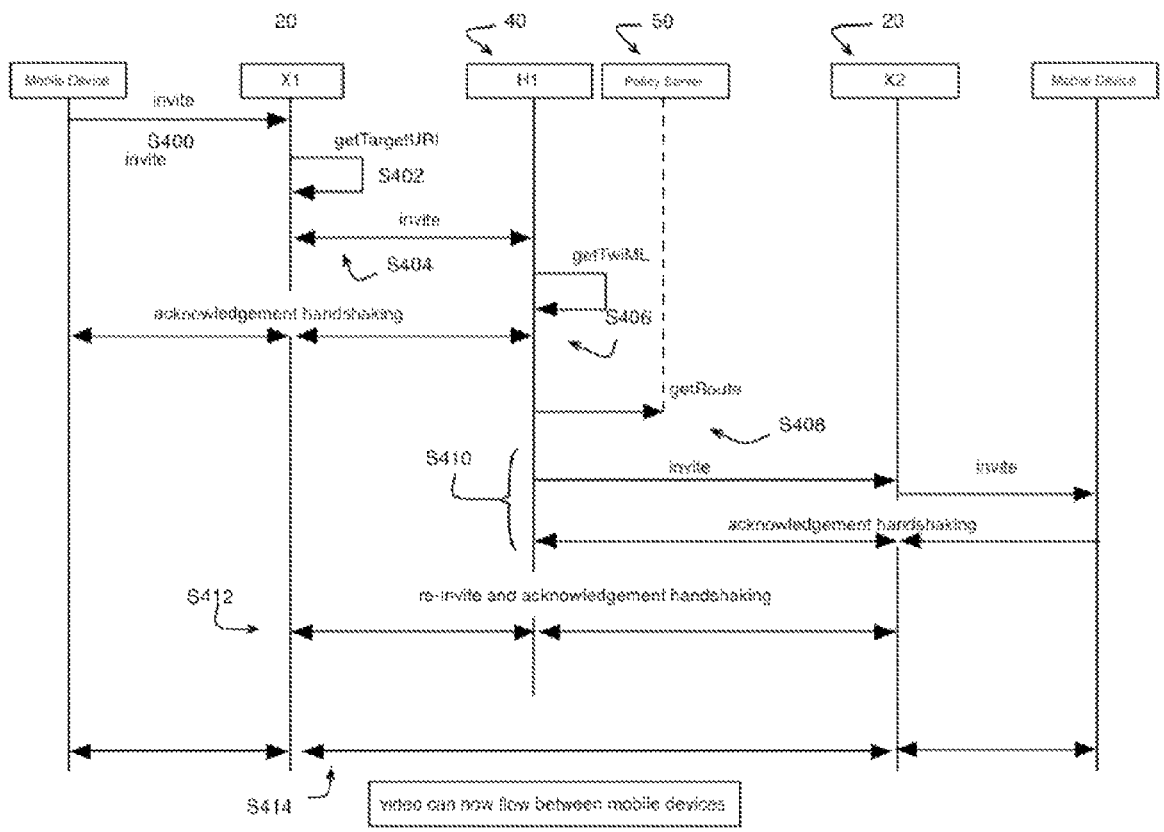
FIG. 8 is an exemplary communication flow diagram of an implementation for a call between two client devices of the method of the preferred embodiment.

As shown in FIG. 8, a second exemplary implementation of the system and/or method of the preferred embodiment can include video streaming between two mobile devices. In this example, client mobile or browser devices may connect directly to communication gateways X1 and X2. This variation functions in a substantially similar manner to the above example but may vary in communication medium/protocols and user devices. In this variation, block S400 may include receiving a video invitation at a first communication gateway X1 from a mobile device. Alternatively, a video invitation may be received at a first communication gateway X1 from a POP. Blocks S402, S404, S406, S408, S410, and S412 are substantially similar to steps S302, S304, S306, S308, S310, and S312 except in implementation differences accommodating for video streaming and direct connection of the mobile devices to the communication gateways. These blocks preferably establish two legs of a communication session such that video can flow between the first and second mobile device in block S414.

Figure 9:
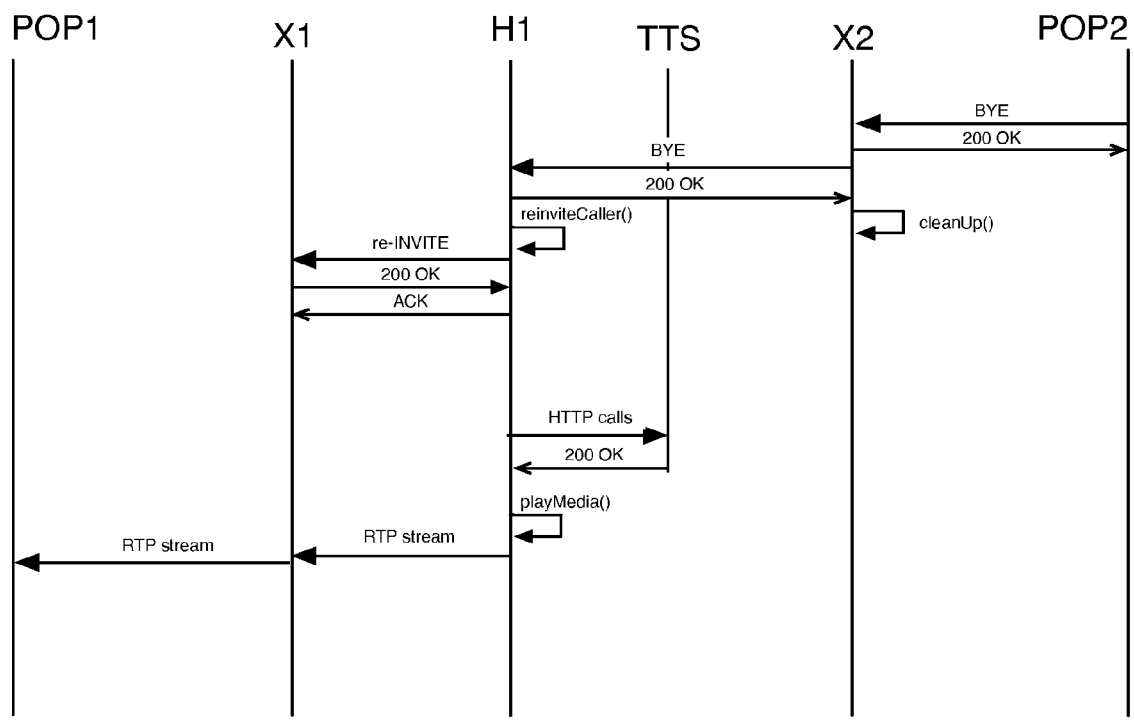
FIG. 9 is an exemplary communication flow diagram of a telephony application with dial followed by a text-to-speech instruction.

As shown in FIG. 9, a third exemplary implementation of the system and/or method of the preferred embodiment can accommodate a dial followed by a text-to-speech command. This is preferably an extension of method 300 above, where a user handing up re-invites between the communication-processing server and the communication gateway can occur multiple times throughout the lifetime of a call. A communication will preferably be initialized as described above so that media communication flows between two endpoints of a first region. One of the endpoints hangs up causing a SIP BYE signal to be sent to a second communication gateway (X2). X2 then propagates the BYE to the communication-processing server (H1) in the second region. The H1 in this scenario will evaluate the application instructions. If more instructions exist within the application, then the H1 can re-invite the first endpoint to bring media communication flow back to the H1 The H1 re-invites the first communication gateway (X1), a 200 OK reply is received, an acknowledgement signal is delivered, and media communication will once again flow between X1 and H1. In this variation, the next communication instruction is to play text-to-speech audio. The H1 will preferably call out to a TTS service to download or access the audio, and then the H1 will stream the media to the X1 and the X1 will stream the media to the first endpoint. In an alternative version, the H1 may instruct the X1 to perform the TTS operations or to use a TTS service of the first region.

Figure 10:
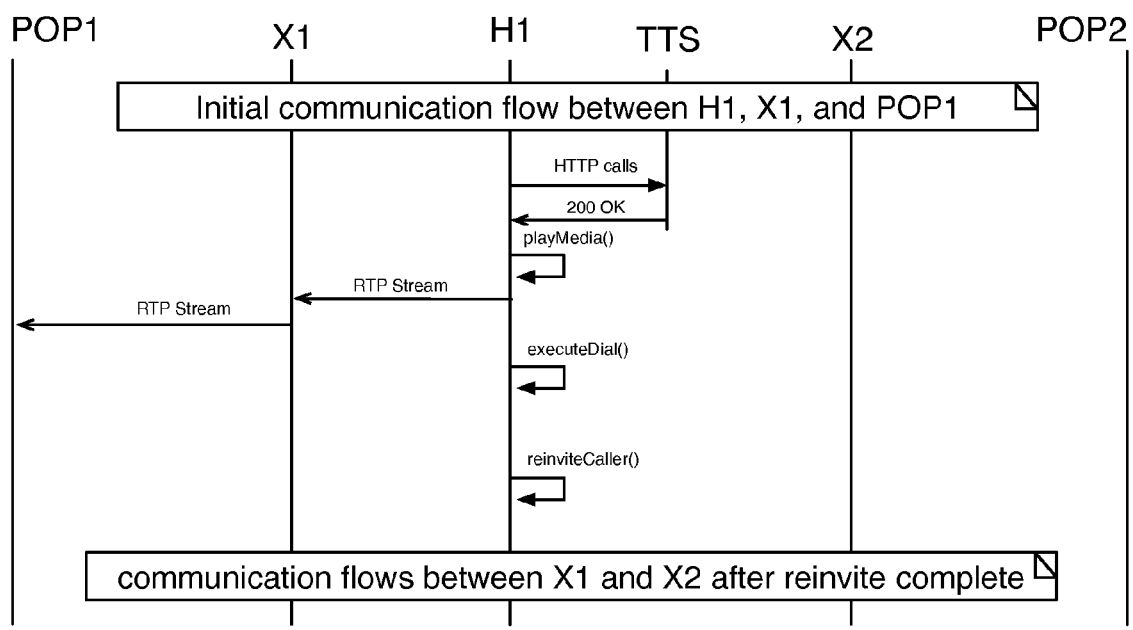
FIG. 10 is an exemplary communication flow diagram of a telephony application with a say instruction followed by a dial instruction.

As shown in FIG. 10, a fourth exemplary implementation of the system and/or method of the preferred embodiment can accommodate a say followed by a dial. A caller form a first region dials in and is invited to a H1 via a communication gateway X1 as in the initial portion of method 300. Once the call has been established, the H1 preferably downloads or accesses the communication platform with the communication instructions. In this particular example, the instructions include a say instruction followed by a dial instruction. The H1 will contact a TTS server and play the media. After the media of the TTS has completed, the H1 will preferably continue to execute the communication instructions and will thus execute the dial instruction. If the dial instruction is to an endpoint in the first region, the second endpoint will be added to the communication flow in a manner similar to that in 300.

Figure 11:
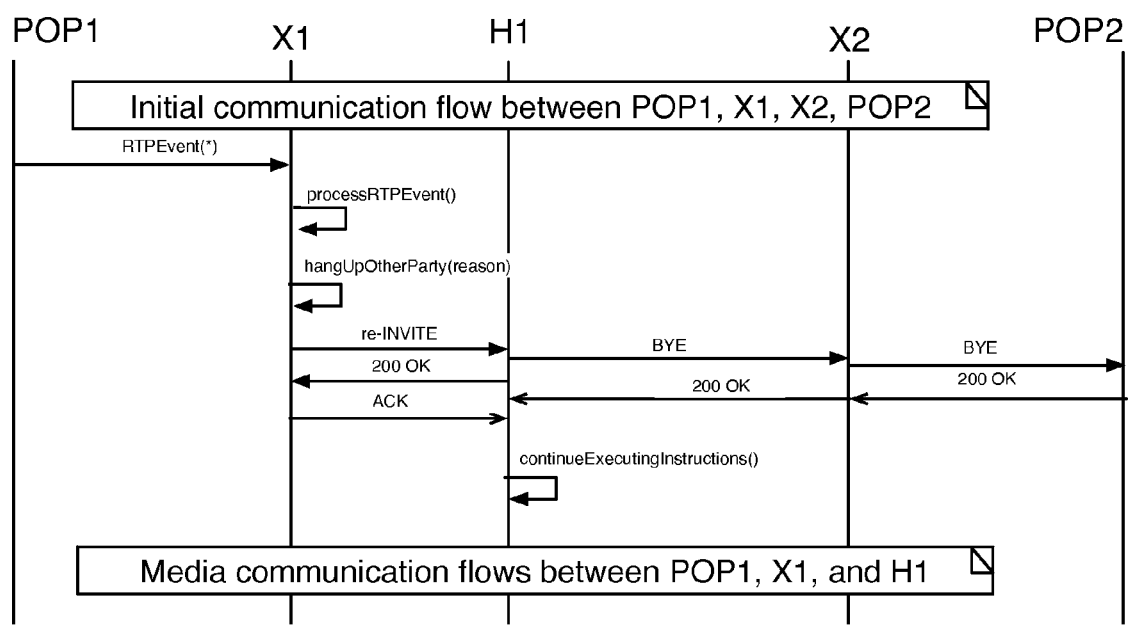
FIGS. 11 and 12 is an exemplary communication flow diagram of a telephony application hanging up a call based on detected input.
Figure 12:
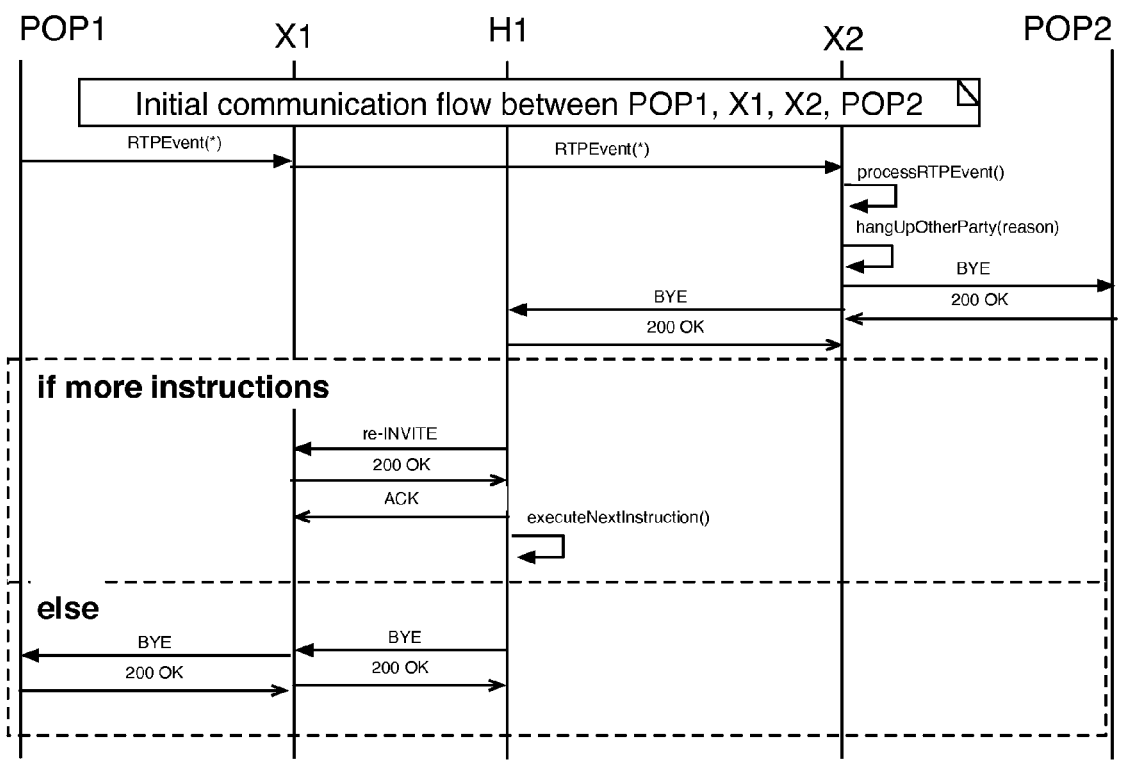

As shown in FIG. 11, a fifth exemplary implementation of the system and/or method of the preferred embodiment can accommodate hanging up a call on a detected input. In this example, the detected input will be the DTMF input of a star (\*). A user presses star when they are ready to end a call. An RTP event is sent to the provider service, which is then delivered to X1. X1 will initiate a hang up of the other party. To hang up, a re-invite signal is sent to the H1 with an action header that asks the communication processing service to hang up the other side. The H1 then issues a BYE sequence to the second endpoint through the X2 and continues executing any remaining application instructions. In an alternative implementation shown in FIG. 12, X1 delivers the RTP event to X2, which initiates the hang up process. X2 signals the end of the call and ends communication with the H1. H1 will then re-invite X1 or hang up depending on the state of the communication platform.

Figure 13:
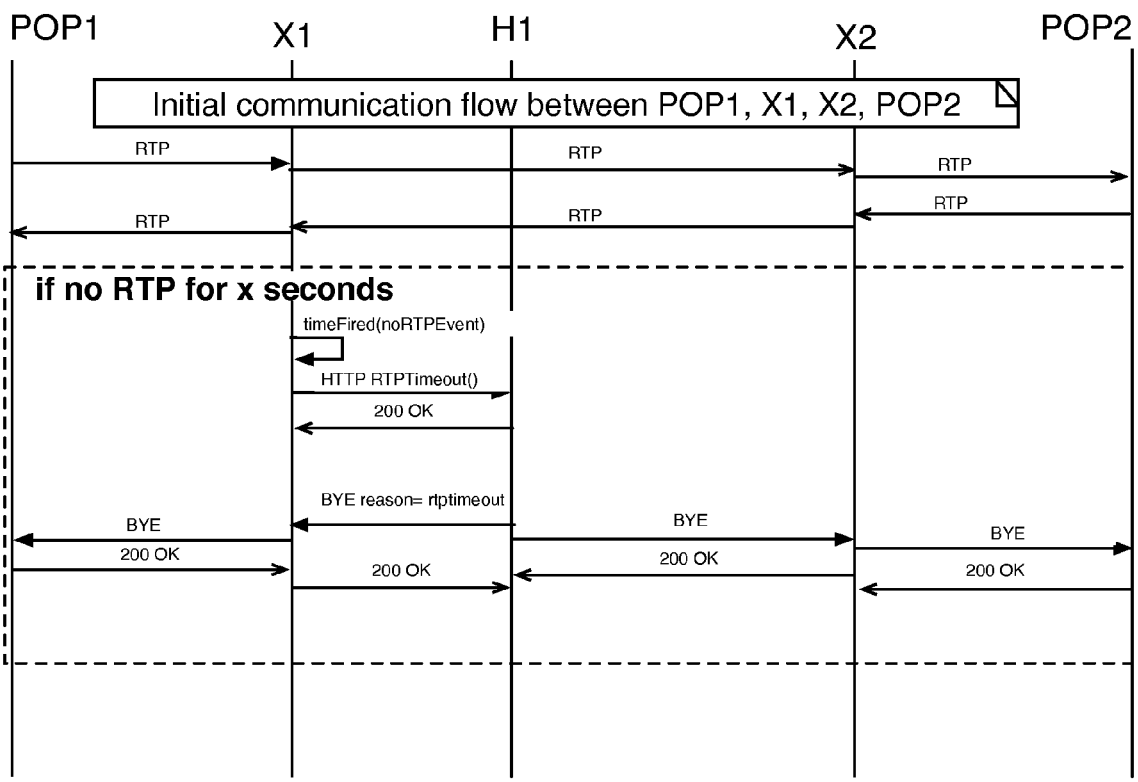
FIGS. 13 and 14 are an exemplary communication flow diagram of a caller or callee timing out.
Figure 14:
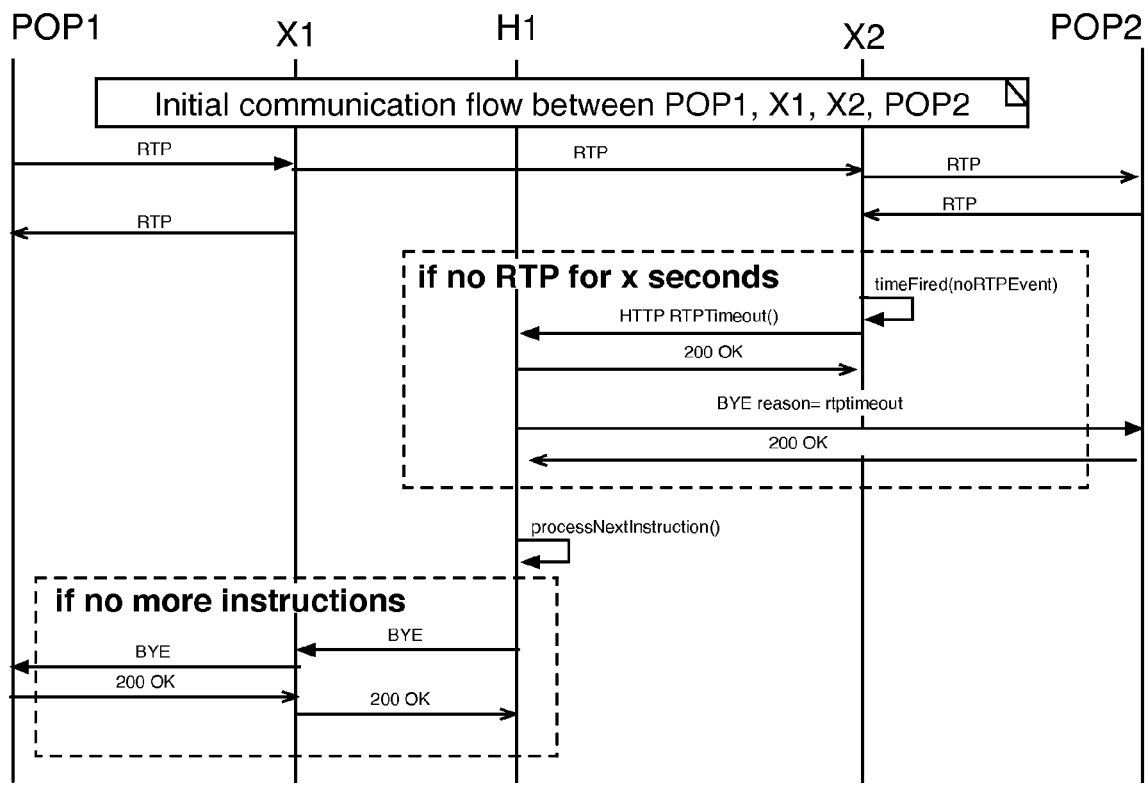

A sixth exemplary implementation of the system and/or method of the preferred embodiment can accommodate timeout scenarios on the caller or callee side. Each communication gateway is preferably responsible for detecting timeouts for their respective leg of the communication. As shown in FIG. 13, the caller side X1 may detect a timeout scenario when the caller endpoint stops sending RTP for a configurable amount of time. X1 then signals the H1 to notify that a timeout has occurred. The H1 will preferably hang up/terminate the caller side and the callee side. The BYE signal preferably includes a header that specifies the reason for the termination (e.g., an RTP timeout). As shown in FIG. 14, the callee side X2 may detect a timeout scenario when the callee endpoint stops sending RTP for a configurable amount of time. X2 signals the error to the H1 and the communication flow is terminated for the callee. As there may still be application instructions that can execute for the caller, the H1 preferably executes any remaining instructions or alternatively terminates communication with the caller.

One or more aspects of the example embodiment can be configured partially or entirely in a computer-readable medium storing computer-readable instructions. The instructions are preferably executed by computer-executable components preferably integrated with one or more APIs, servers, routing policy servers, POP servers, and/or communication gateways. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method for architecting a geographically distributed communication computing platform comprising:
   at a SIP signaling gateway of a first region, receiving a SIP communication invitation, the communication originating from a first communication endpoint directed through a provider service;
   signaling a communication invitation to a communication-processing server in a second region, wherein the first region and second region are at least two thousand miles apart;
   at the communication-processing server, retrieving application instructions from an internet accessible server at a URI that is associated with a destination endpoint of the communication invitation;
   at the communication-processing server, processing the retrieved application instructions;
   upon encountering an instruction requiring media flow, establishing a media communication flow with the first endpoint, querying a routing policy service of the second region for a selected communication route, and establishing a media communication flow with a resource of the selected communication route;
   wherein establishing a media communication flow with a resource of the selected communication route comprises if the instruction includes communicating with a second endpoint of the first region, establishing a communication flow with a second gateway, the second gateway establishing communication flow with the second endpoint through a provider service of the first region, and signaling for media communication to flow between the first and second endpoints through the first and second gateways of the first region.

2. The method of claim 1, further comprising if the second endpoint terminates media communication through the two gateways of the first region, re-inviting the communication-processing server, and the communication-processing server processing subsequent application instructions.

3. The method of claim 1, wherein establishing a media communication flow with a resource of the selected communication route comprises if the instruction includes a media resource not in the first region, the communication-processing server establishing media communication flow with the media resource of the second region, the communication gateway, and the first endpoint through the gateway of the first region.

4. The method of claim 1, wherein the first and second endpoints can be communicating with an audio medium, a video medium, or screen-sharing medium.

5. The method of claim 4, wherein the first and second endpoints communicate to the provider service with a PSTN protocol or a SIP protocol.

6. A method for architecting a geographically distributed communication computing platform with a subset of resources in a first region and a subset of resources in a second region comprising:

at a signaling gateway of a first region, receiving a communication invitation of a first endpoint from a communication provider;

signaling the communication invitation to a communication-processing server in a second region;

in response to communication processing of the communication-processing server, dynamically directing signaling and media of the communication according to processing instructions and resources available in at least the first and two regions;

wherein dynamically directing signaling and media communication of the communication comprises selectively routing media communication exclusively through communication resources of the first region if resources are available in the first region or selectively routing media communication between the first endpoint, the gateway, and at least the communication-processing server if media resources are not in the first region.

7. The method of claim 6, wherein routing media communication exclusively through communication resources of the first region comprises inviting a second gateway, the second gateway inviting a second endpoint accessible through a provider service of the first region, and the communication-processing server re-inviting the first and second communication gateway to establish media communication flow between the first and second communication gateway and away from the communication-processing server.

8. The method of claim 7, wherein upon the second endpoint terminating communication flow, re-establishing communication with the communication-processing server.

9. The method of claim 7, wherein the first and second endpoints are PSTN endpoints.

10. The method of claim 7, wherein the first and second endpoints are client application endpoints.

11. The method of claim 6, wherein the signaling uses a SIP signaling protocol.

12. The method of claim 6, wherein communication flow support the first endpoint and second endpoint connecting to the provider service through different communication mediums, the possible communication mediums comprising audio, video, and screen-sharing.

13. The method of claim 6, wherein the communication-processing server is a call router; and further comprising the call router retrieving telephony application instructions from an internet accessible server at a URI that is associated with a destination endpoint of the communication invitation, and processing the retrieved telephony application instructions.

14. The method of claim 6, wherein the resources available in the first region are media services.

15. The method of claim 14, wherein the media services comprise a text-to-speech service, a recording service, and a transcoding service.

16. A system for managing synchronous communication across regions comprising:

a communication-processing server in a first region configured to retrieve application instructions from an addressable resource associated with a destination endpoint of a communication invitation and process the retrieved application instructions;

service provider interfaces in a second region with communication to outside communication endpoints in the second region;

a communication gateway of the second region configured to dynamically redirect signaling and media communication flow between at least one endpoint of the second region and the communication-processing server of the first region during the duration of a synchronous communication session;

wherein the first region and the second region are within geographically distinct regions wherein latency of media communication flow between the first region and the second region is greater than latency of media communication flow between endpoints of the second region.

17. The system of claim 16, further comprising a routing policy server communicatively coupled to the communication-processing server and configured to select a communication gateway for communication between at least the first and second region during a communication session.

18. The system of claim 17, wherein the signaling is SIP signaling; and wherein the first and second communication endpoints can be a PSTN endpoint or a client application endpoint.

19. The system of claim 18, wherein the communication medium supported by the service provider interfaces in the second region comprise audio communication, video communication, and screen-sharing communication.

20. The system of claim 17, further comprising media resources of the second region that are configured for media communication flow within the second region independent of the communication-processing server of the first region.

21. The system of claim 20, wherein the media resources comprise a text-to-speech resource, a recording resource, and a media transcoding resource.

22. The system of claim 16, wherein the distance between the first region and the second region is greater than 2000 miles.

* * * * *